United States Patent
Gretz

(10) Patent No.: US 8,658,895 B1
(45) Date of Patent: Feb. 25, 2014

(54) PRE-WIRED TV BRIDGE KIT

(75) Inventor: Thomas J. Gretz, Port St. Lucie, FL (US)

(73) Assignee: Arlington Industries, Inc., Scranton, PA (US)

(*) Notice: Subject to any disclaimer, the term of this patent is extended or adjusted under 35 U.S.C. 154(b) by 263 days.

(21) Appl. No.: 13/385,395

(22) Filed: Feb. 18, 2012

Related U.S. Application Data

(63) Continuation-in-part of application No. 12/660,745, filed on Mar. 3, 2010, now Pat. No. 8,563,876.

(51) Int. Cl.
*H01H 9/02* (2006.01)
*H01R 13/502* (2006.01)
*H02G 3/14* (2006.01)
*H05K 5/03* (2006.01)
*H05K 5/00* (2006.01)

(52) U.S. Cl.
USPC .......... 174/58; 174/53; 174/559; 174/66; 174/67; 361/724

(58) Field of Classification Search
USPC .......... 174/50, 53, 58, 541, 653, 655, 559, 174/480, 66, 67; 312/223.1, 223.2, 223.3, 312/223.6; 361/600, 724, 730, 752
See application file for complete search history.

(56) References Cited

U.S. PATENT DOCUMENTS

| | | | | |
|---|---|---|---|---|
| 5,008,491 | A * | 4/1991 | Bowman | 174/489 |
| 7,005,578 | B2 * | 2/2006 | Gretz | 174/58 |
| 7,064,271 | B1 * | 6/2006 | Gretz | 174/58 |
| 7,279,635 | B2 | 10/2007 | Hyde | |
| 7,304,236 | B1 * | 12/2007 | Gretz | 174/58 |
| 7,312,396 | B1 | 12/2007 | Gorman | |
| 7,485,805 | B1 * | 2/2009 | Gretz | 174/50 |
| 7,518,061 | B1 * | 4/2009 | Gretz | 174/58 |
| 7,569,771 | B2 | 8/2009 | Nicholson | |
| 7,830,248 | B2 | 11/2010 | Logvinov et al. | |
| 7,841,878 | B2 | 11/2010 | Johson et al. | |

* cited by examiner

*Primary Examiner* — Hoa C Nguyen
*Assistant Examiner* — Binh Tran

(57) ABSTRACT

A pre-wired TV bridge kit including a kit, package, or assembly of components for mounting a TV to a wall while eliminating disruption to the visible wall surface. The kit includes a first pre-wired electrical box with a pre-wired receptacle and attached electrical cable, a second pre-wired electrical box connected to the opposite end of the electrical cable, and a cord grip and flexible cord secured to the second electrical cable. Both electrical boxes include rotatable flags to enable installation to existing walls. The pre-wired TV bridge kit simplifies the task of providing an electrical outlet on a portion of the wall that is remote from an existing outlet. After mounting the pre-wired TV bridge kit to a wall, the flexible cord is simply plugged into an existing outlet in order to feed power through the flexible cord to power the first and second pre-wired electrical boxes and the TV.

11 Claims, 5 Drawing Sheets

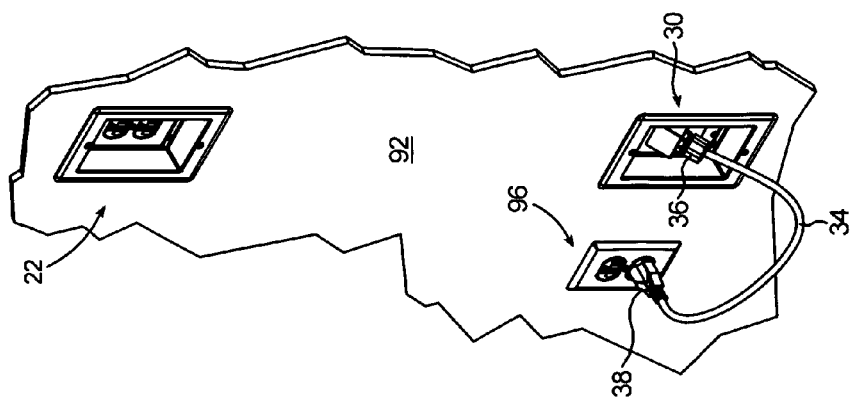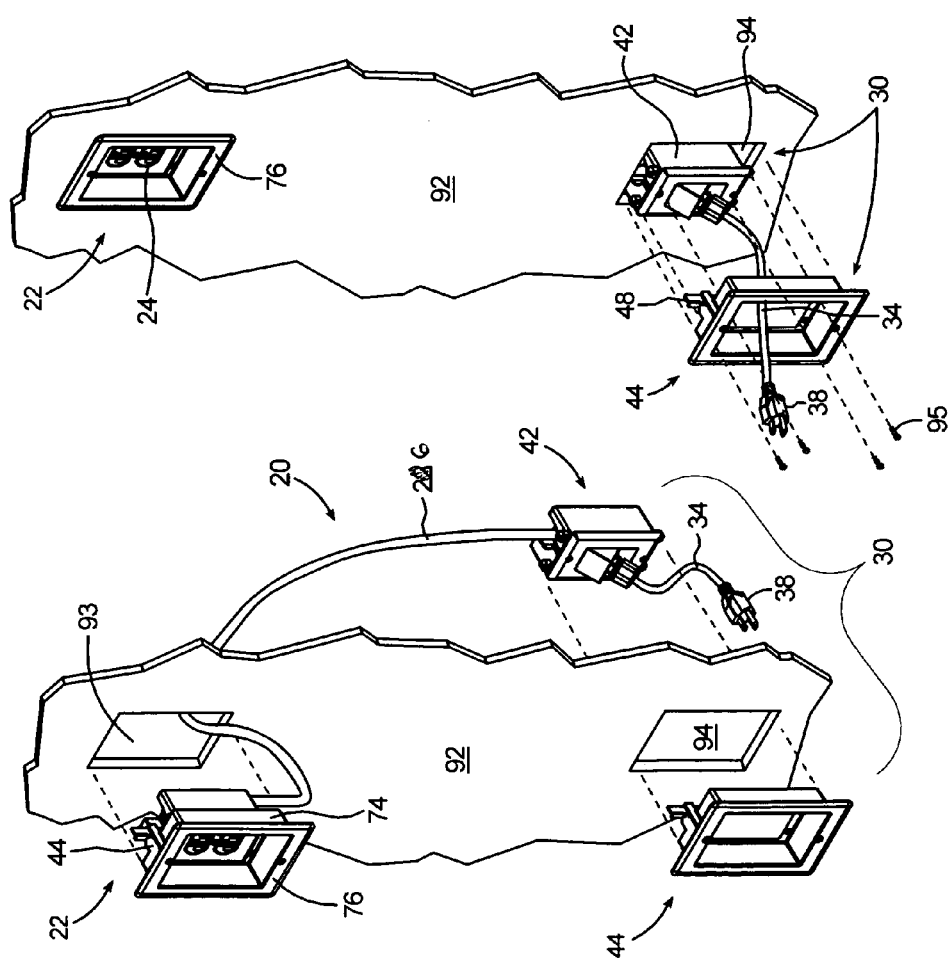

PRE-WIRED TV BRIDGE KIT

This application is a Continuation-In-Part of U.S. patent application Ser. No. 12/660,745 filed Mar. 3, 2010 now U.S. Pat. No. 8,563,876, the entire contents of which are incorporated herein by reference.

FIELD OF THE INVENTION

This invention relates to the installation of electrical components and specifically to pre-wired television (TV) bridge kit that eliminates the need to disturb wall studs in order to provide electrical outlets on a wall for the mounting of a flat panel TV or similar device thereto.

BACKGROUND OF THE INVENTION

The proliferation of wall-mountable flat panel televisions has lead to an increase in the number of wall-mounted TVs. As the TVs are of light weight, homeowners commonly mount TVs to the wall to free up floor space and thereby eliminate the need for a stand to obtain the optimum viewing height.

Aesthetically, when mounting a TV on a wall, it is desirable to keep the electrical cables out of sight. Thus, even if an existing electrical outlet is available directly under the newly installed TV, it is preferable to route electrical cables within the wall to conceal them from sight. Providing an electrical outlet for the TV by conventional means typically requires locating the closest existing electrical box, installing a new outlet box at the location of the TV, pulling electrical cable between the boxes, and completing the wiring connections to provide line voltage to the new electrical box.

Many times the existing electrical outlets are located at some distance horizontally from the desired location of the TV, making it necessary to remove a portion of the drywall, drill holes in the underlying studs, and pull electrical cable through the studs. This is a very time consuming task as the wallboard is disrupted and must be replaced and the wall must be plastered and repainted or re-wallpapered to restore the wall to its original condition.

What is needed therefore is a device and method for installing an electrical outlet on a wall that causes no disruption to the visible wall surface below a wall-mounted TV, does not require alteration of the underlying studs, eliminates the pulling of electrical cables through adjacent studs in the wall, and eliminates extensive repairs to the drywall and wall surface after the cables are installed. When installed, such a device should provide a clean wall underneath the wall-mounted TV, with no visible cables running the TV to the electrical outlet.

SUMMARY OF THE INVENTION

The invention is a pre-wired TV bridge kit. It includes a kit, package, or assembly of components for mounting a TV to a wall with minimal disruption to the wall surface. The kit includes a first pre-wired electrical box with a pre-wired receptacle and attached electrical cable, a second pre-wired electrical box connected to the opposite end of the electrical cable, and a cord grip and a flexible cable secured to the second electrical cable. Both electrical boxes include rotatable flags to enable installation in old work situations. The pre-wired TV bridge kit considerably simplifies the task of providing an electrical outlet on a portion of the wall that is remote from an existing outlet. After mounting the pre-wired TV bridge kit to a wall, the flexible cord is simply plugged into a nearby outlet after which line voltage is fed from the flexible cord to power the first and second pre-wired electrical boxes and thus the TV connected to the first electrical box.

OBJECTS AND ADVANTAGES

Several advantages are achieved with the pre-wired TV bridge kit of the present invention, including:
(1) The pre-wired TV bridge kit enables an installer to provide power to a wall-mounted TV while eliminating the need to remove drywall or disrupt the wall surface surrounding the TV.
(2) The pre-wired TV bridge kit eliminates the need to alter underlying studs in order to supply electricity to a wall-mounted TV.
(3) The pre-wired TV bridge kit eliminates the need to pull electrical cables through adjacent studs in the wall.
(4) The pre-wired TV bridge kit provides a means of powering a TV without damaging surrounding wall surfaces.
(5) The pre-wired TV bridge kit eliminates unsightly visible cables surrounding any wall-mounted TV to which it supplies power.

These and other objects and advantages of the present invention will be better understood by reading the following description along with reference to the drawings.

DESCRIPTION OF THE DRAWINGS

FIGS. 8a, 8b, and 8c are conceptual schematics depicting the installation sequence of the pre-wired TV bridge kit of the present invention.

DETAILED DESCRIPTION OF THE INVENTION

Figure 1:
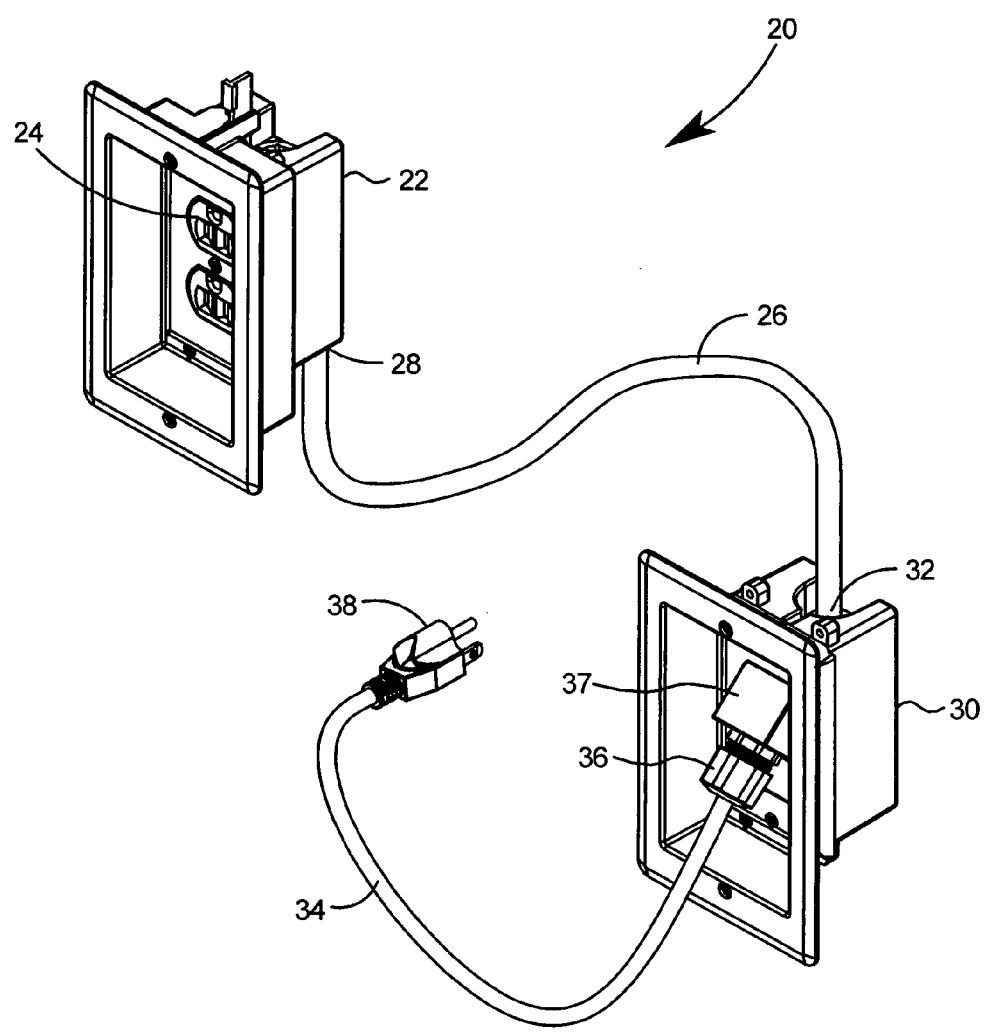
FIG. 1 is a perspective view of the pre-wired TV bridge kit of the present invention.

Referring to FIG. 1 there is shown a preferred embodiment of a pre-wired TV bridge kit 20 according to the present invention. The pre-wired TV bridge kit 20 includes a first pre-wired electrical box 22 including a pre-wired receptacle 24 and an electrical cable 26 electrically connected or wired at a first end 28 to the pre-wired receptacle 24. The pre-wired TV bridge kit 20 also includes a second pre-wired electrical box 30 electrically connected or wired to the second end 32 of the electrical cable 26. The pre-wired TV bridge kit 20 further includes a flexible electrical cord 34 secured to the second pre-wired electrical box 30 by cord grip 36. The cord grip 36 in turn is secured in a liquid-tight fit to a cable-entry scoop 37. All of the wiring connections internal to the first and second electrical boxes 22 and 30 are completed such that the electrical cord 34 has electrical continuity with the pre-wired receptacle 24. Thus, if the electrical plug or plug end 38 of the pre-wired TV bridge kit 20 is plugged into a live wall electrical outlet (not shown), such connection will carry current through electrical cord 34, through second pre-wired electrical box 30, through electrical cable 26 and into first pre-wired electrical box 22, whereby pre-wired receptacle 24 will be powered. Thus pre-wired TV bridge kit 20 provides an installer with the ability to power one electrical box 22 by reverse electrical feed from a second electrical box 30. A preferred cord grip 36 and scoop 37 for connecting an electrical cord to an electrical box are respectively the LPCG50 cord grip and the CED1 scoop, which are available from Arlington Industries of Scranton, Pa.

Figure 3:
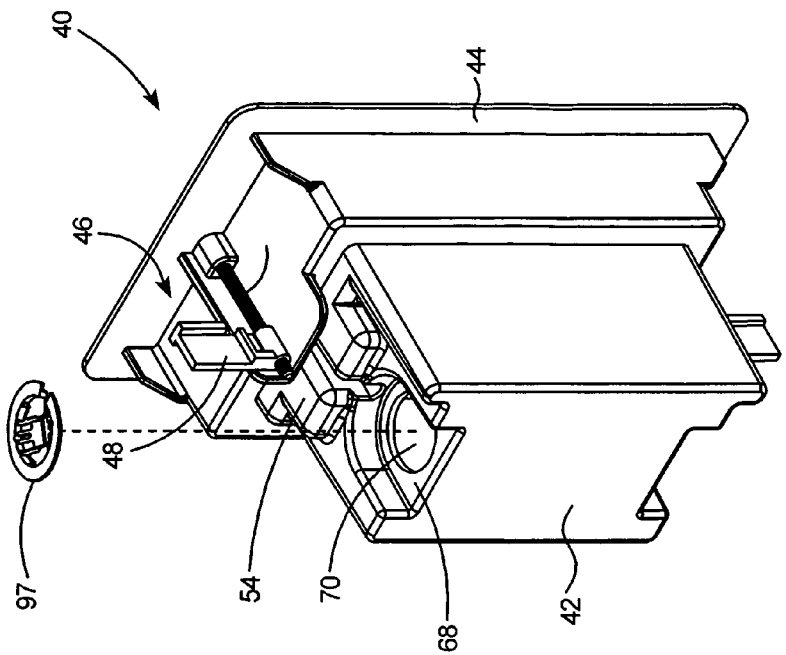
FIG. 3 is a rear perspective view of the electrical box and trim plate assembly of FIG. 2.
Figure 2:
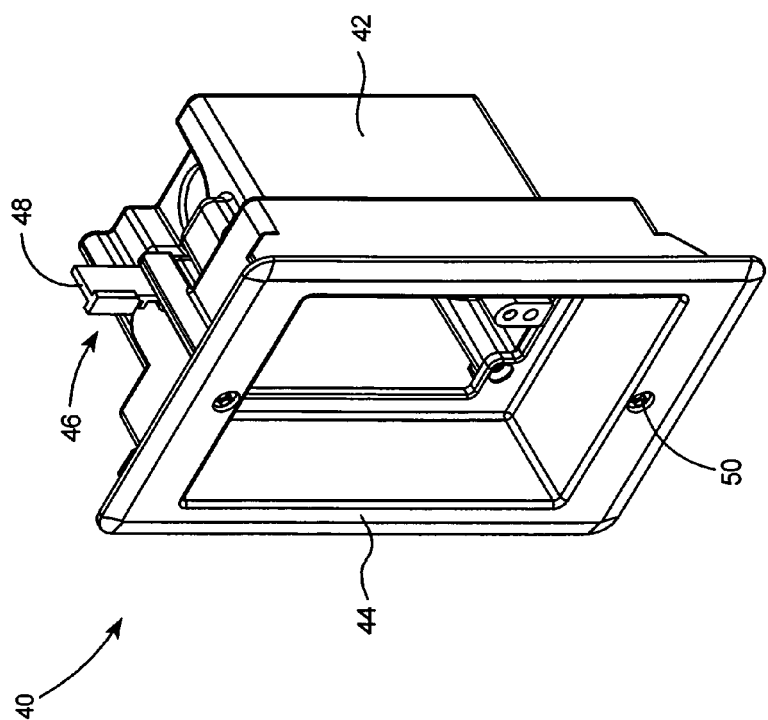
FIG. 2 is a front perspective view of an electrical box and trim plate assembly that forms a portion of the pre-wired TV bridge kit of FIG. 1.

With reference to FIGS. 2 and 3, first and second pre-wired electrical boxes each include an electrical box assembly 40 that includes an electrical housing 42 and a trim plate 44. Electrical box assembly 40 includes a mounting arrangement 46 for securing the electrical box assembly 40 to a wall (not shown). The mounting arrangement 46 includes rotatable flags 48 to enable installation to an existing wall. Rotatable flags 48 are attached to the end of mounting fasteners 50 that can be rotated clockwise to draw rotatable flags toward the trim plate 44.

Figure 5:
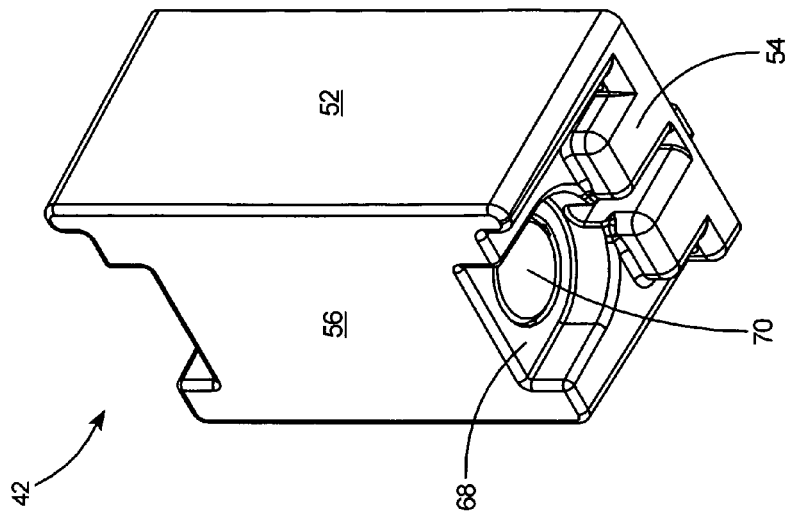
FIG. 5 is rear perspective view of the electrical box portion of the electrical box and trim plate assembly of FIG. 2.
Figure 4:
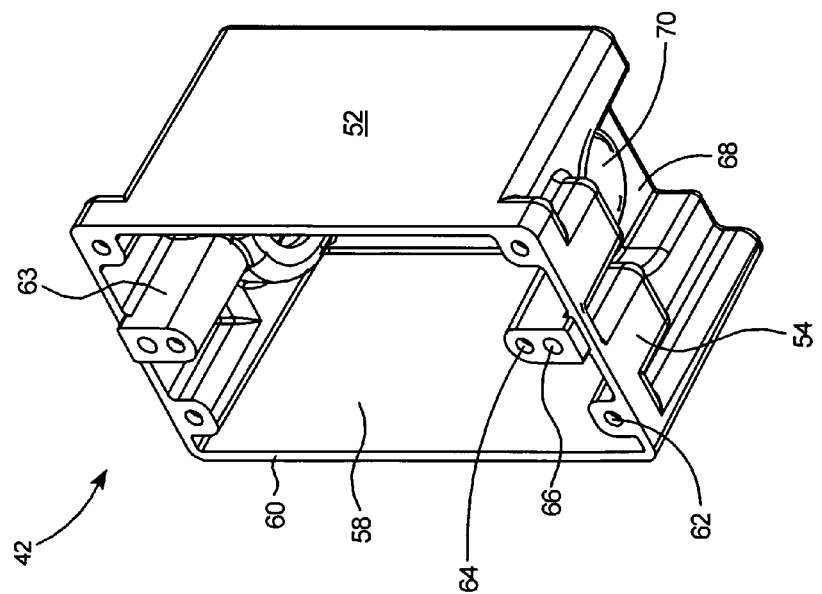
FIG. 4 is a front perspective view of the electrical box portion of the electrical box and trim plate assembly of FIG. 2.

As shown in FIGS. 4 and 5, electrical housing 42 includes side walls 52, end walls 54, and a back wall 56 defining an electrical enclosure 58 therein. Electrical housing 42 further includes a front edge 60, one or more bores 62 in the front edge 60, and component bosses 63 with inner bores 64 and outer bores 66 therein. The component bosses 63 extend slightly beyond front edge 60 as shown in FIG. 4. End walls 54 of electrical housing 42 include a cable entry surface 68 that is recessed from each of the end walls 54 and a knockout wall portion 70 therein.

Figure 7:
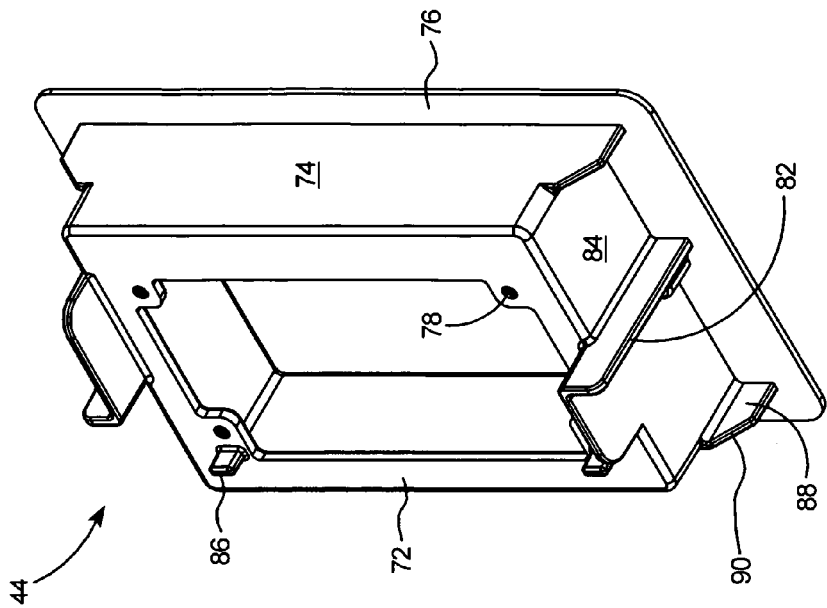
FIG. 7 is a rear perspective view of the trim plate portion of the electrical box and trim plate assembly of FIG. 2.
Figure 6:
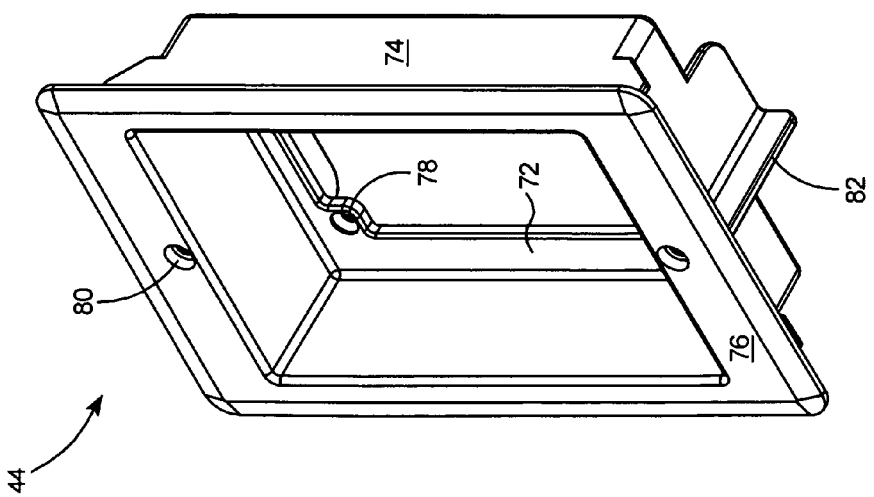
FIG. 6 is a front perspective view of the trim plate portion of the electrical box and trim plate assembly of FIG. 2.

With reference to FIGS. 6 and 7, trim plate 44 includes a rear frame 72, a peripheral wall 74 extending from the rear frame 72, and a flange 76 extending from the peripheral wall 74. The trim plate 44 includes apertures 78 in the rear frame 72 and apertures 80 in the flange 76. A rail 82 is integral with and extends from the end portion 84 of the peripheral wall 74. Alignment tabs 86 extend rearward from the rear frame 72 and braces 88 extend between the rear frame 72 and the peripheral wall 74. Braces include sloped rear surfaces 90 thereon.

For operation of the present invention, reference is made to FIGS. 8a to 8c. The pre-wired TV bridge kit 20 vastly simplifies the task of mounting a flat panel TV (not shown) on a wall 92 and enables a homeowner to safely do the installation while eliminating the need for the homeowner to complete any internal electrical wiring. The desired location for mounting a TV is usually some distance above the wall outlets that typically are mounted near floor level. The closest existing wall outlet may be located some distance laterally from the desired TV mounting location, thereby requiring an installer to install an electrical box and receptacle at the desired location and then feed an electrical cable from the existing wall outlet to the newly installed electrical box. Installing an electrical box in this manner typically creates a difficult and time-consuming repair job that entails replacing drywall, plastering, and repainting.

The pre-wired TV bridge kit 20 eliminates the need for wall repairs and provides a device that enables a homeowner to safely provide power to a flat panel TV or similar electrical component. As shown in FIG. 8a, to operate the invention an installer would cut an upper hole 93 in the wall 92 at the desired mounting location of the TV (not shown) and a lower hole 94 at approximately the level of the existing electrical receptacles. The holes 93 and 94 would be of a size to accommodate the peripheral wall 74 of trim plate 44 but smaller than flange 76. Trim plate 44 is then removed from the second pre-wired electrical box 30 and electrical housing 42 along with pre-wired electrical cord 34 and cable 26 are fed through upper hole 93.

With reference to FIG. 8b, electrical plug 38 and cord 34 are then pulled through lower hole 94 and through trim plate 44 of second pre-wired electrical box 30. Trim plate 44 is then secured to electrical housing 42 with fasteners 95 to form second pre-wired electrical box 30. Second pre-wired electrical box 30 is then secured to the wall 92 by rotating flags 48 until the flags are drawn securely against the wall 92. The installer then secures first pre-wired electrical box 22 to the wall by rotating flags 48 until the flags are drawn securely against the wall 92.

With reference to FIG. 8c, with the first and second pre-wired electrical boxes 22 and 30 firmly secured to the wall, the installer simply plugs the plug end 38 of electrical cord 34 into an existing electrical outlet 96 to provide power to both pre-wired electrical boxes 22 and 30. As all of the electrical boxes 22 and 30 are pre-wired, there is no need for the installer to secure any internal wiring within the electrical boxes. Although electrical cord 34 appears substantially short in FIG. 8c, this is for illustration purposes, and electrical cord could be substantially long, such as 8 feet in length or even longer, to enable an installer to reach a substantially distant existing electrical outlet. If, for example, the existing electrical outlet is 8 feet away from the second pre-wired electrical box 30 and wall studs (not shown) are spaced at 16-inches, the pre-wired TV bridge kit 20 of the present invention eliminates the need to remove portions of the wall 92 and drill through 6 studs. The pre-wired TV bridge kit 20 thereby provides a means of supplying line voltage to a TV or similar electrical appliance or device without the need to tear up existing walls or to pull cables through studs.

Although the invention is described herein mainly as a pre-wired TV bridge kit 20, it should be understood that the assembly of pre-wired electrical boxes can also be provided in a package or as a loose assembly of components. Although the description herein describes the first and second pre-wired electrical boxes 22 and 30 of the pre-wired TV bridge kit 20 as being completely assembled within the kit, it should be understood that the each of the pre-wired electrical boxes 22 and 30 could be provided with the trim plate 44 and electrical housing 42 portions separated from one another and such separation would not detract from the operation of the invention. As the electrical components such as the pre-wired receptacle 24 and the pre-wired cord grip 36 are secured to the electrical housings 42, separation of each respective trim plate 44 from the associated electrical housing 42 does not compromise the integrity of the wiring connections within the electrical housings 42. Thus an installer need not rewire any connections within the electrical housings 42, but merely secure the pre-wired electrical boxes 22 and 30 to the wall.

As shown in FIG. 3, the electrical box assembly 40 may include a knockout or removable wall portion 70 therein in the cable entry surface 68 that is recessed from each of the end walls 54 of the electrical housing 42. The recessed area cable entry surface 68 enables the use of electrical fittings or connectors such as the NM840 push-in fitting or connector 97 for connecting non-metallic cable to electrical boxes, which connector 97 is available from Arlington Industries of Scranton, Pa. The cable entry surface 68 permits use of the push-in connectors 97 while preventing the connectors from projecting beyond the end walls 54 and interfering with placement of the pre-wired TV bridge kit in locations where space is tightly restricted.

Various portions of the pre-wired TV bridge kit 20, including the electrical housing 42 and the trim plate 44, may be constructed of metal or plastic. Most preferably, the electrical housing 42 and the trim plate 44 are each molded in one piece of plastic. Suitable plastics include polycarbonate and polyvinylchloride.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A pre-wired TV bridge kit comprising: a first pre-wired electrical box including a pre-wired receptacle, said receptacle electrically connected to a first end of an electrical cable; a second pre-wired electrical box electrically connected to a second end of said electrical cable, said second pre-wired electrical box including a cord grip and a flexible electrical cord secured to said second pre-wired electrical box in a liquid-tight fit; and a mounting arrangement for securing said first and second pre-wired electrical boxes to a wall; wherein each of said pre-wired electrical boxes include an electrical housing; and a trim plate; wherein said electrical housing includes side walls, end walls, and a back wall defining an electrical enclosure therein; and a front edge and one or more bores in said front edge; wherein said trim plate includes a rear frame; a peripheral wall extending from said rear frame; and a flange extending from said peripheral wall; wherein said trim plate includes alignment tabs extending from said rear frame; and braces extending between said rear frame and said peripheral wall.

2. The pre-wired TV bridge kit of claim 1 wherein said trim plate includes apertures in said rear frame.

3. The pre-wired TV bridge kit of claim 2 wherein said mounting arrangement includes apertures in said flange of said trim plate; mounting fasteners extending through said apertures in said flange of said trim plate; and rotatable flags attached to said mounting fasteners.

4. The pre-wired TV bridge kit of claim 1 wherein said flexible electrical cord is secured to said second pre-wired electrical box in a liquid-tight fit.

5. The pre-wired TV bridge kit of claim 4 wherein said liquid-tight fit includes
a scoop secured to said electrical housing of said second pre-wired electrical box; and
said cord grip is secured to said scoop.

6. The pre-wired TV bridge kit of claim 1 wherein said trim plate includes an end portion on said peripheral wall; and a rail integral with and extending from said end portion of said peripheral wall.

7. The pre-wired TV bridge kit of claim 1 wherein said braces include sloped rear surfaces.

8. The pre-wired TV bridge kit of claim 1 wherein said electrical housing includes component bosses; and inner bores and outer bores in said component bosses.

9. The pre-wired TV bridge kit of claim 8 wherein said component bosses extend slightly beyond said front edge of said electrical housing.

10. The pre-wired TV bridge kit of claim 1 wherein said end walls of said electrical housing include a cable entry surface, said cable entry surface is recessed from each of said end walls; and a knockout wall portion in said cable entry surface.

11. The pre-wired TV bridge kit of claim 1 wherein
said flexible electrical cord includes an electrical plug; and
said electrical plug has electrical continuity with said pre-wired receptacle.

\* \* \* \* \*